US008572262B2

(12) United States Patent
Ensing et al.

(10) Patent No.: US 8,572,262 B2
(45) Date of Patent: Oct. 29, 2013

(54) SYSTEM AND METHOD FOR CONTROLLING CONNECTIONS TO AN APPLICATION SERVER

(75) Inventors: Karen Ensing, Carp (CA); Kimberly Chaila Horne, Ottawa (CA); Rajpal Ruprai, Ottawa (CA); Heloise Rose Doucet, Ottawa (CA); Atiq Ur Rehman Awan, Kanata (CA)

(73) Assignee: BlackBerry Limited, Waterloo (CA)

( * ) Notice: Subject to any disclaimer, the term of this patent is extended or adjusted under 35 U.S.C. 154(b) by 270 days.

(21) Appl. No.: 13/050,003

(22) Filed: Mar. 17, 2011

(65) Prior Publication Data

US 2012/0239817 A1 Sep. 20, 2012

(51) Int. Cl.
*G06F 15/16* (2006.01)

(52) U.S. Cl.
USPC ........... 709/228; 709/227; 709/206; 709/207; 709/220; 709/223; 709/224; 709/225; 704/260; 704/270

(58) Field of Classification Search
USPC ........................................................ 709/228
See application file for complete search history.

(56) References Cited

U.S. PATENT DOCUMENTS

| | | | | |
|---|---|---|---|---|
| 6,732,150 | B1 | 5/2004 | Thrane | |
| 7,113,803 | B2 | 9/2006 | Dehlin | |
| 7,921,214 | B2 * | 4/2011 | Da Palma et al. | 709/227 |
| 2004/0019695 | A1 | 1/2004 | Fellenstein et al. | |
| 2006/0009243 | A1 | 1/2006 | Dahan et al. | |
| 2008/0070697 | A1 * | 3/2008 | Robinson et al. | 463/42 |
| 2008/0147406 | A1 * | 6/2008 | Da Palma et al. | 704/260 |
| 2009/0209235 | A1 * | 8/2009 | Lawler et al. | 455/413 |
| 2010/0234018 | A1 * | 9/2010 | Lawler et al. | 455/426.1 |
| 2011/0047219 | A1 | 2/2011 | Tripathi et al. | |

FOREIGN PATENT DOCUMENTS

| | | | |
|---|---|---|---|
| WO | WO 2004/057888 | A1 | 7/2004 |
| WO | WO 2008/117116 | A2 | 10/2008 |
| WO | WO 2009/049380 | A1 | 4/2009 |

OTHER PUBLICATIONS

Iapichino, G.; Search Report from corresponding European Application No. 11158739.0; search completed Jul. 26, 2011.

Webster, Scott; "Facebook adds chat and push notifications to Android app"; Dec. 15, 2010; http://www.cnet.com/8301-19736_1-20025786-251.html#ixzz1lm13ppLp.

"Integrating with Facebook Chat—Facebook Developers"; Apr. 6, 2011; http://developers.facebook.com/docs/chat/; Accessed online Feb. 8, 2011.

(Continued)

*Primary Examiner* — Jude Jean Gilles

(74) *Attorney, Agent, or Firm* — Brett J. Slaney; Blake, Cassels & Graydon LLP

(57) ABSTRACT

A system and method are provided for controlling a connection to an application server. The method comprises storing a chat state indicative of interactivity with a chat feature in a social networking application; detecting resumption of the social networking application subsequent to an interruption thereto; determining the chat state; and restoring the chat feature for the social networking application to the determined chat state. The method may also, upon detecting inactivity with respect to the chat feature, comprise executing one or more operations to maintain a connection with a server for the social networking application according to a first communications protocol. The method may also, upon detecting that a second period of time has elapsed subsequent to detecting inactivity, comprise receiving data associated with the chat feature according to a second communications protocol.

25 Claims, 13 Drawing Sheets

(56) References Cited

OTHER PUBLICATIONS

"XMPP becoming common standard for real-time chat applications"; Sep. 12, 2010; http://www.anas.co.in/2010/09/xmpp-becoming-common-standard-for-real.html.

"BeejivelM—Android Market"; Apr. 6, 2011; https://market.android.com/details?id=com.beejive.im; online at least as early as Feb. 2011.

"BeejiveIM for Facebook Chat—Android Market"; Apr. 6, 2011; https://market.android.com/details?id=com.beejive.im.fbchat; online at least early as Feb. 2011.

"eBuddy Messenger—Android Market"; Apr. 6, 2011 https://market.android.com/details?id=com.ebuddy.android; online at least early as Feb. 2011.

"Chat on Facebook on BerryReview App Superstore"; Apr. 6, 2011; http://store.berryreview.com/product.asp?id=106906&n=Facebook-Chat-Pro; online at least early as Feb. 2011.

"IM+iPhone application—AppStoreHQ"; Apr. 6, 2011; http://www.appstorehq.com/im--iphone-128/app; online at least as early as Feb. 2011.

* cited by examiner

SYSTEM AND METHOD FOR CONTROLLING CONNECTIONS TO AN APPLICATION SERVER

TECHNICAL FIELD

The following relates generally to systems and methods for controlling connections to an application server.

BACKGROUND

Electronic communication devices may support client applications that, in order to communicate with other devices or entities in a communication network, are also operable to communicate with a respective backend infrastructure such as a server or other platform.

In order to provide reliable communication paths between devices and entities in the network, a connection between the device or entity and the backend infrastructure is often maintained, controlled, managed, etc. For example, in order to enable one device to participate in an exchange of data with another, individual connections between the devices and the backend infrastructure can be maintained such that the data is routed from the one device to the other device via the backend infrastructure.

BRIEF DESCRIPTION OF THE DRAWINGS

Embodiments will now be described by way of example only with reference to the appended drawings wherein.

DETAILED DESCRIPTION OF THE DRAWINGS

Figure 1:
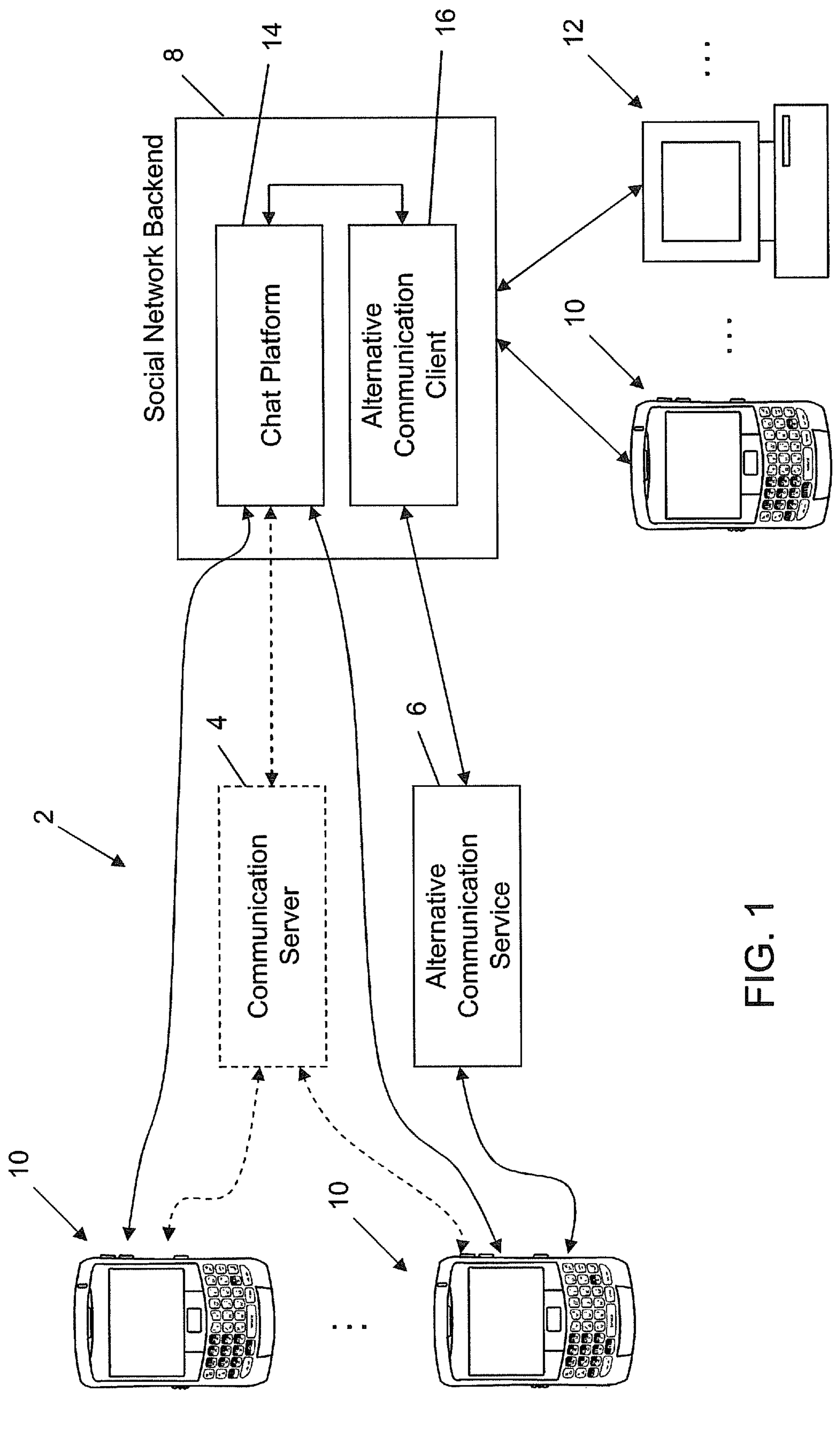
FIG. 1 is a block diagram of an example communication system.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

Many communication-based applications such as instant messaging (IM) or other "chat" or conversational related applications allow a client application on a communication device, to specify, be given, or otherwise posses, various presence states or statuses, e.g., "ONLINE", "OFFLINE", "IDLE", etc. In addition to enabling such states to be updated according to a user's interactions with the application, it has been found that by storing the state, if a device or application reset occurs, or a connection with an application server is disrupted or lost, upon a resumption of the application or device, the application can be restored to the previous state. In this way, the user does not need to access the application and update or otherwise change their state to have it restored.

In order to enable the user to be reachable via the communication-based applications, often a connection to a backend application server needs to be maintained or otherwise controlled. In addition to storing the application state for resuming operations and taking steps to maintain a connection during user inactivity, it has been found that an alternative communication channel, when available, can be used to enable the application to operate in a "hibernate" mode such that incoming messages can still be sent to, and received by, the device, even if a connection to the application server is not maintained, by having the backend configured to communicate via the alternative communications channel.

Although the principles discussed below are applicable to any electronic communication device, examples will be provided for a mobile communication device, which is one of many types of electronic communication devices.

For clarity in the discussion below, mobile communication devices may be commonly referred to as "mobile devices" for brevity. Examples of applicable mobile devices may include, without limitation, cellular phones, smart-phones, wireless organizers, pagers, personal digital assistants, computers, laptops, handheld or other wireless communication devices, wirelessly enabled notebook computers, portable gaming devices, tablet computers, or any other portable electronic device with processing and communication capabilities.

Figure 2:
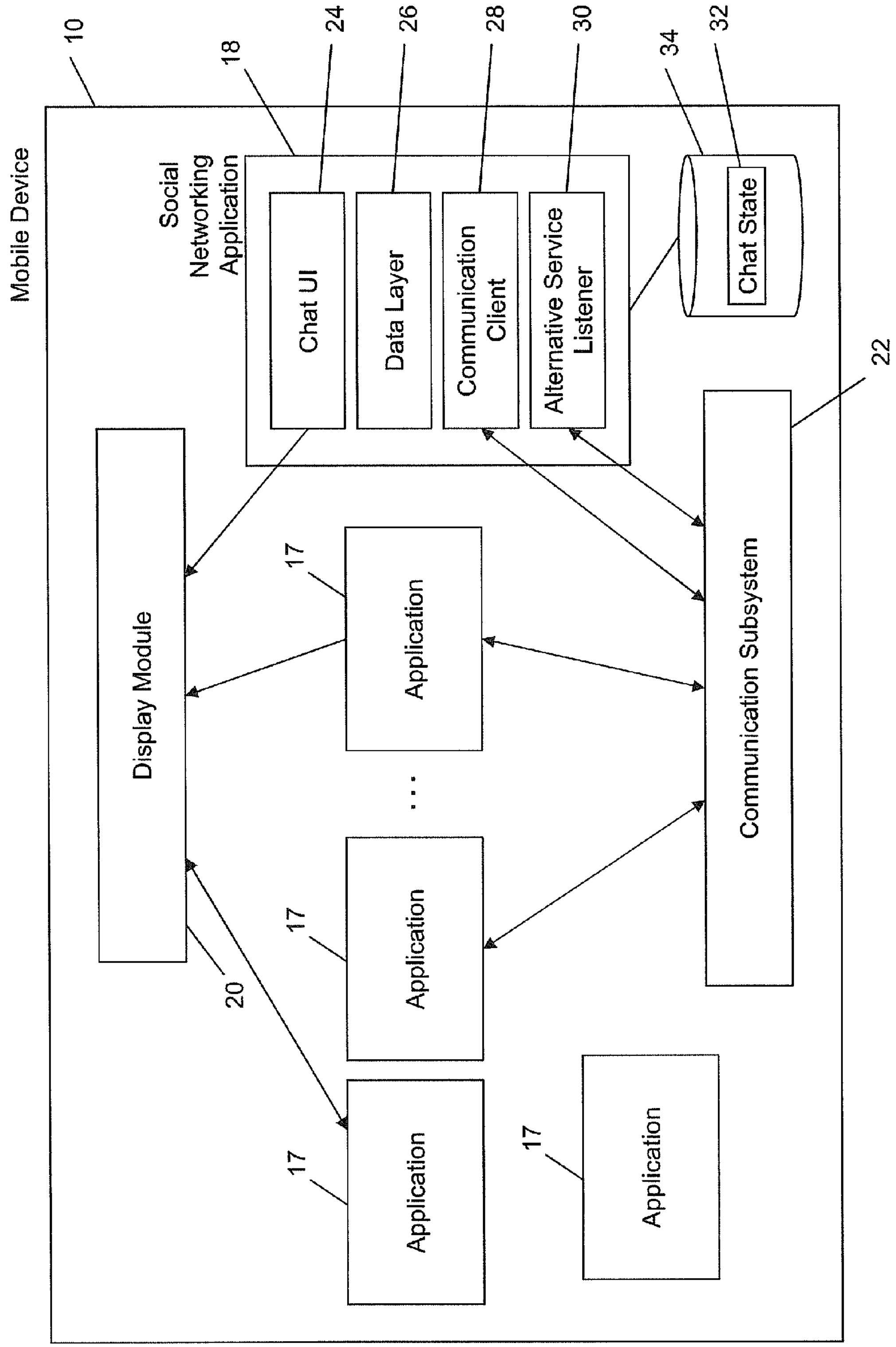
FIG. 2 is a block diagram illustrating an example configuration for a mobile device operable to connect to a social network backend in the wireless communication system of FIG. 1.

Turning to FIG. 1, a communications system is shown for enabling one or more particular mobile devices 10 to communicate with other mobile devices 10 and/or other communication devices such as desktop computers 12 using a social networking application 18 (see also FIG. 2). In the example shown in FIG. 1, the particular mobile devices 10 are operable to communicate with a social network backend infrastructure ("backend 8" hereinafter) via a network 2. It can be appreciated that the network 2 may represent any device, component, server, service or entity that enables data to be exchanged between the mobile device 10 and the backend 8. The network 2 in this example may include, in some embodiments, a communication server 4 for enabling normal or regular communications via one communications protocol, and an alternative communication service 6 for enabling at least some connectivity to be maintained between the mobile device 10 and the backend 8 in a "hibernate" mode using another or "alternative" communications protocol, e.g., for when that mobile device 10 is not actively utilizing the social networking application 18. It can be appreciated that in some embodiments, the mobile device 10 may communicate directly with the chat platform 14 via the network 2 and, as shown in FIG. 1, some mobile devices 10 may be communicable with the backend 8 via the alternative communication service 6, and others only communicable with the backend 8 via the network 2 (e.g., directly or via the communication server 4).

The social network, which is associated with the social networking application 18, and which comprises or otherwise utilizes the backend 8, in this example, provides a chat feature (e.g., chat functionality within the social networking application 18 or a related chat-based application—not shown). The chat feature in this example is facilitated using a chat platform 14, which may comprise one or more servers or other components to enable users of the chat feature to communicate with each other using their respective devices 10, 12. The chat platform 14 facilitates normal or regular communications to and from mobile devices 10 connectable to the network 2, e.g., directly or via the communication server 4.

The backend 8 also comprises an alternative communication client 16 that is operable to communicate with mobile devices 10 connectable to the network 2, via the alternative communication service 6. In this example, the chat platform 14 can transfer or "hand off" communication responsibilities to the alternative communication client 16 to maintain a connection between the network 2 and the backend 8 without needing to maintain the normal connection between the mobile device 10 and the chat platform 14 (e.g., via a carrier or communication server 4, etc.). For example, when a particular user is not actively using the social networking application 18 on their mobile device 10, (e.g., no detected activity for a particular period of time), the connection between the mobile device 10 (e.g., via communication server 4) and the chat platform 14 can be closed, and messages or other data to be sent to that particular user can be routed to their mobile device 10 using the alternative communication client 16 and alternative communication service 6, until a resumption of activity by that particular is subsequently detected. For connections between the mobile device 10 and the chat platform 14 (e.g., via the communication server 4) that may consume relatively substantial resources on both the client side and the server side, the ability to maintain connectivity without keeping such a connection persistently alive can be particularly advantageous.

It can be appreciated that the chat platform 14 and alternative communication client 16 are shown separately in FIG. 1 only for ease of illustration and may equally operate under control of the same entity, module, component, etc. For example, an existing chat platform 14 can be modified to perform the operations of the alternative communication client 16, an alternative communication client 16 can be modified to include a chat platform 14 or provide the functionality thereof, etc.

FIG. 2 illustrates an example configuration for a mobile device 10 operable to communicate with the backend 8 via the network 2 as shown in FIG. 1. It can be appreciated that various components of the mobile device 10 have been omitted from FIG. 2 for ease of illustration. The mobile device 10 includes the social networking application 18 which, as noted above, is a client-based application operable to communicate with client applications on other devices 10, 12 via the backend 8. As shown in FIG. 2, the mobile device 10 may also include various other applications 17, which may be graphical user interface (GUI)-capable, communications-capable, both GUI-capable and communications-capable, or neither (e.g., a background application 17). The social networking application 18 and other communications-capable applications 17 communicate with the network 2 using a communication subsystem 22. The social networking application 18 and other GUI-capable applications 17 may provide various GUI components on a display of the mobile device 10 using a display module 20.

The social networking application 18 comprises a chat UI component 24 for providing and managing one or more UIs; a data layer 26 for passing data obtained in a communication to the chat UI component 24, and enabling inputs detected via the chat UI component 24 to cause data to be created, edited, saved, communicated, etc.; a communication client 28 for communicating with the network 2 (e.g., via the communication server 4); and an alternative service listener 30 for detecting the existence of or otherwise "listening" for data inbound from the network 2 via the alternative communication service 6, as will be explained in greater detail below. The social networking application 18 in this example embodiment also stores a chat state 32 in a persistent data store 34, to enable the user's state to be restored following an application interruption such as an upgrade or other application reset, loss of power (e.g., device "power off") or other device reset, socket connection error or other disruption, etc.

Figure 3:
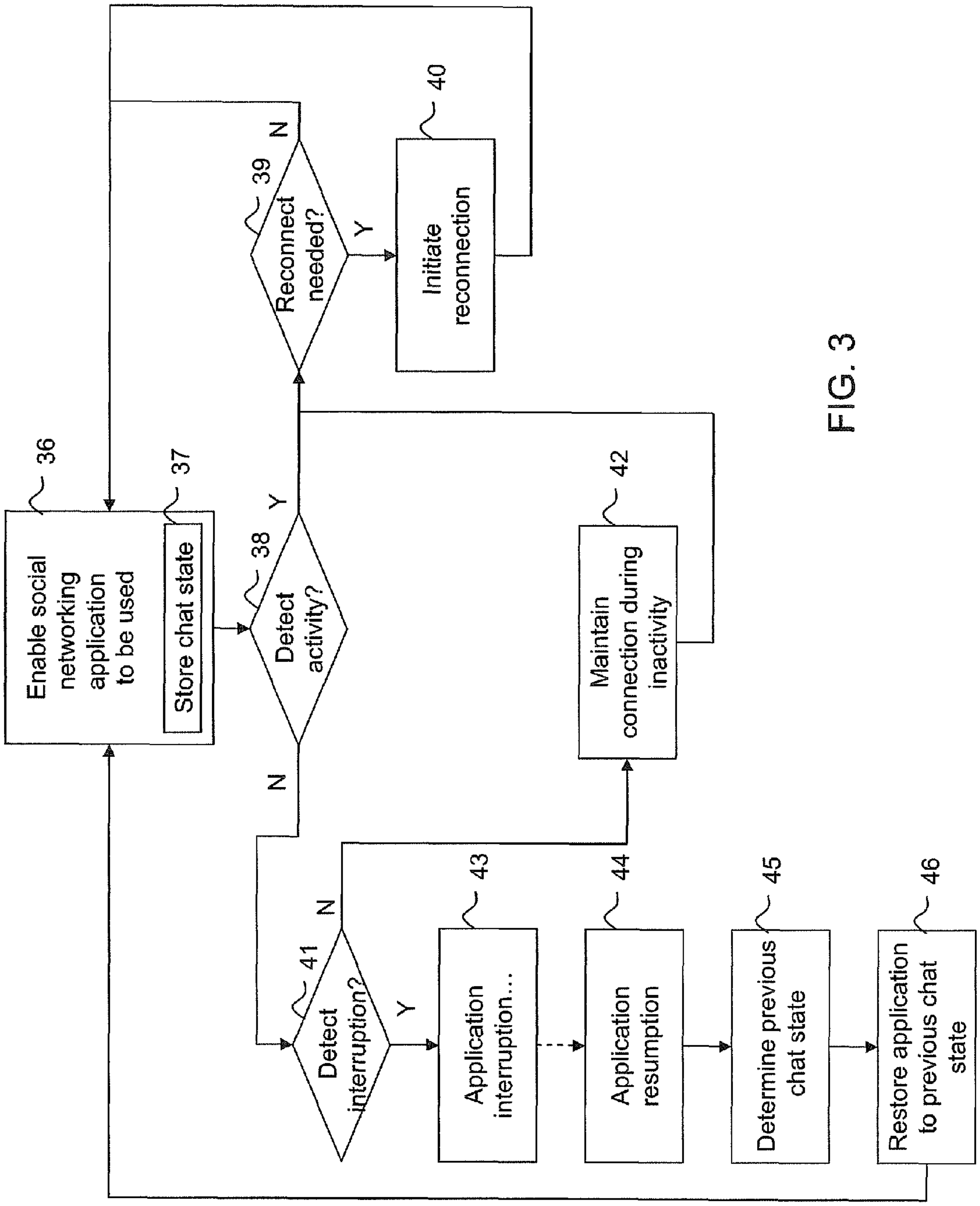
FIG. 3 is a flow chart providing an example set of computer executable operations for controlling a connection between an application and an application server.

As discussed above, in order to enable a user of the social networking application 18 to at least appear to be online, whether or not they are actively using the social networking application 18, various measures can be taken to account for different circumstances. Such different circumstances may include, for example, active use of the social networking application 18, inactivity with respect to the social networking application 18, application or device resets connection errors, etc. Turning now to FIG. 3, an example set of computer executable operations is shown for managing connections between a mobile device 10 and the backend 8.

At 36, the mobile device 10 enables the social networking application 18 to be used. This may include providing access to the social networking application 18 (e.g., via a link, icon, application "switch" function, etc.); active, user-related interactions with the chat UI 24 or other UIs within the social networking application 18; passive, user-related interactions with the social networking application 18 such as by providing the ability to view updates or notifications associated with the social networking application 18 (e.g., in a banner or other mobile device UI component); and passive, background interactions, such as sending and receiving data to and from the backend 8 (e.g., receiving messages from other devices 10, 12). In this example, one background interaction performed by the social networking application 18 is to store the chat state 32 at 37. For example, while the user is actively using the social networking application 18, i.e. ONLINE, or is available but IDLE, the chat state 32 can be set to ONLINE. On the other hand, if the social networking application 18 is set to be OFFLINE, the chat state 32 is set to be OFFLINE. As discussed above, by storing the chat state 32 and changes thereto while the social networking application 18 is available to be used, should an application reset, device reset, connection disruption, or any other interruption occur, upon completion of the reset or resolution of the disruption or interruption, the social networking application 18 can resume normal operation in the same state that is was prior to the reset, disruption, or interruption.

In order to enable the social networking application 18 to be used at 36 according to an "always on" model from the perspective of the backend 8 and those other devices 10, 12 connectable thereto, the mobile device 10 can monitor activity with respect to the social networking application 18, in order to determine whether operations are needed to maintain a connection since, for example, connection to components in the network 2 (e.g., communication server 4) and connections to the backend 8 may disconnect after particular periods of inactivity. Activity with respect to the social networking application 18 is determined at 38. If there is detected activity with respect to the social networking application 18, e.g., activation of a chat screen, detection of characters being entered into a chat screen, etc.; the mobile device 10 then determines at 39 if such activity is ongoing or a resumption of activity. As will be described below, measures may be taken to maintain a connection when no activity is detected with respect to the social networking application 18 and, in some circumstances, e.g., when using the alternative communication service 6, a reconnection to the chat platform 14 may be required to exit a hibernate mode. To provide a seamless transition and provide the impression that the social networking application 18 was continually connected or "always on", upon detecting activity with respect to the social networking application 18, the mobile device 10 can initiate such a reconnection to the chat platform 14. If a reconnection is not needed, e.g., the activity detected is ongoing, the social networking application 18 may continue to be used at 36. If a reconnection is needed, a reconnection is initiated at 40 and the social networking application 18 may continue to be used at 36. It can be appreciated that the reconnection initiated at 40 may include various operations such as re-establishing a socket connection (e.g., with the communications server 4), re-establishing a connection with the chat platform 14 via a particular protocol such as XMPP, providing availability presence messages, etc. As such, reconnecting the mobile device 10 to the backend 8 at 40 may comprise any individual connection operation required to begin normal communications with the chat platform 14.

If no activity is detected at 38, the mobile device 10 may then determine at 41 if such inactivity is due to an interruption of the social networking application 18. For example, the social networking application 18 may be interrupted due to an application reset such as for upgrading or reinstalling the application, may be due to a device reset such as a restart or shut down or loss of power to the mobile device 10, may be due to a socket or other connection error, etc. If no interruption to the social networking application 18 is detected at 41, one or more operations may be performed at 42 to maintain a connection with the backend 8 while the inactivity continues. Maintaining such a connection can be done in various ways, examples of which will be explained in greater detail below.

It has also been found that in some scenarios, such as use of the alternative communication service 6 and alternative communication client 16 may have a timeout period established by the backend 8. In other words, the backend 8 may only allow use of the alternative communication client 16 to allow the mobile device 10 to operate in a hibernate mode for a predetermined period of time (e.g., a predetermined number of hours). In order to ensure that such a timeout does not occur, the mobile device 10 may determine at 39 if a reconnection is needed and, if so, a reconnection with the chat platform 14 can be initiated at 40. By maintaining a connection at 42 and, if necessary, performing periodic reconnections to the chat platform 14 at 40, the social networking application 18 can continue to be used at 36. As such, there are cases where the mobile device 10 can both maintain connections during inactivity and, if necessary, initiate reconnections with the chat platform 14. It can be appreciated that if a connection error such as a socket error occurs while maintaining the connection at 42, the mobile device 10 may automatically attempt to reconnect the social networking application 18 to the backend 8, e.g., a certain number of times before determining that a connection interruption has occurred. This may be done in addition to determining whether a reconnection is needed due to a timeout requirement by the chat platform 14.

If the mobile device 10 determines at 41 (or detects a connection error during 42) that an application interruption has occurred, the application interruption typically occurs for a period of time at 43, which may be determinate (e.g., during a reset) or indeterminate (e.g., due to a loss of power). In this example, it is assumed that the social networking application 18 resumes operation at 44, i.e. the interruption is resolved, corrected, expires, or otherwise ceases. Since the chat state 32 was stored while the social networking application 18 was available for use at 36, the mobile device 10 can restore the social networking application 18 to its previous state by determining the previous chat state 32 at 45 and having the social networking application 18 restored to that state at 46 for subsequent normal operation at 36.

For example, if the user had set themselves to be OFFLINE prior to a device upgrade or prior to turning off their mobile device 10, upon turning on their mobile device 10 subsequently, the social networking application 18 will resume operating in an OFFLINE state. If, on the other hand, the user was actively using the social networking application 18 and their state was set to ONLINE, or a connection was maintained during inactivity and their state was set to IDLE (or was otherwise "available" before the interruption), the social networking application 18 can resume operating in an ONLINE state and, if further inactivity is detected can revert to an IDLE state as will be discussed in greater detail below. In this way, the user does not have to remember to access the social networking application 18 upon an interruption being resolved to set their state or status to what it was previously.

Figure 4:
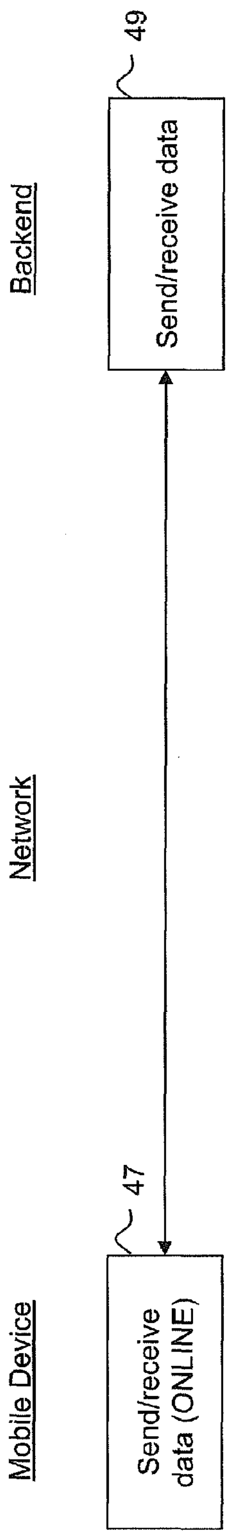
FIG. 4 is a flow chart providing an example set of computer executable operations for sending and receiving data in an online state.

Interactions between the mobile device 10, network 2, and backend 8 for updating the social networking application 18 state and maintaining a connection between the mobile device 10 and backend 8, are illustrated in FIGS. 4 to 7. FIG. 4 illustrates an example scenario wherein the social networking application 18 is actively being used and thus the user's state is ONLINE. The mobile device 10 in this example sends and receives data in an ONLINE state at 47 via the network 2 (e.g., directly or using the communication server 4) to and from the backend 8 at 48. The backend 8, e.g., using the chat platform 14, sends and receives data to and from the mobile device via network 2, and to and from other devices 10, 12 at 49.

Figure 5:
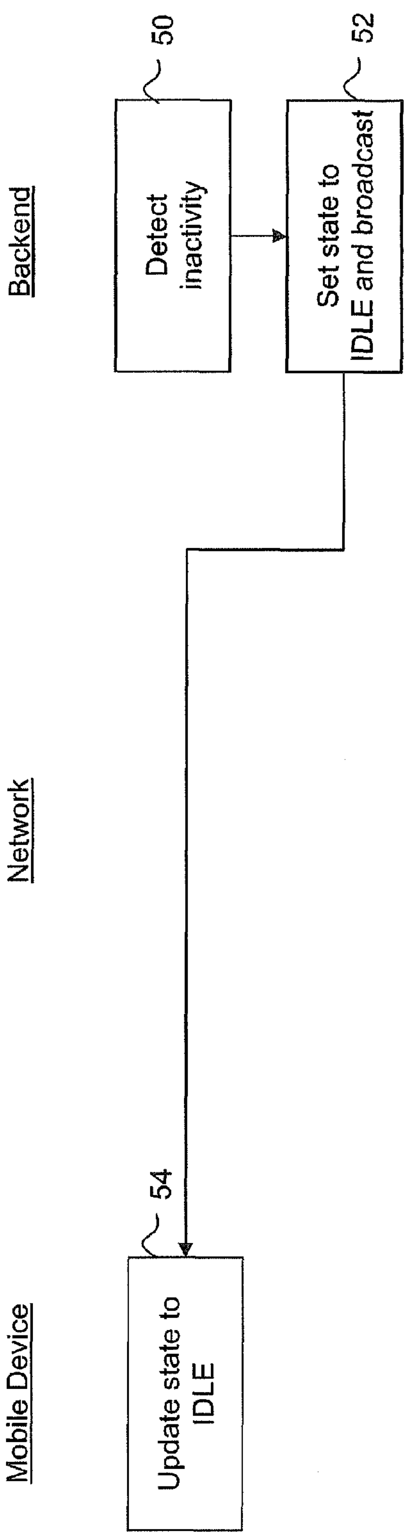
FIG. 5 is a flow chart providing an example set of computer executable operations for updating an application state to idle based on inactivity.

FIG. 5 illustrates example computer executable operations that may be performed to update a user's state to IDLE. In this example, the backend 8, e.g., the chat platform 14, detects inactivity with respect to that user at 50 and sets the state for that user to IDLE and broadcasts an update to the user's mobile device 10 and their contacts at 52. The mobile device 10 receives the update and has the social networking application 18 update the user's state locally to be IDLE at 54. By broadcasting an update in this way, a user's contacts can see that the user is available and reachable but not necessarily active or currently engaged. The IDLE state can coincide with the initiation of a hibernate mode via the alternative communication service 6. It can be appreciated that the IDLE state could also be used if the particular mobile device 10 is not communicable with the alternative communication service 6 but may not be needed if a connection is maintained with the chat platform 14 during inactivity detected at the mobile device 10. In such cases, the state would be ONLINE unless a connection is closed or the mobile device 10 is otherwise OFFLINE.

Figure 6:
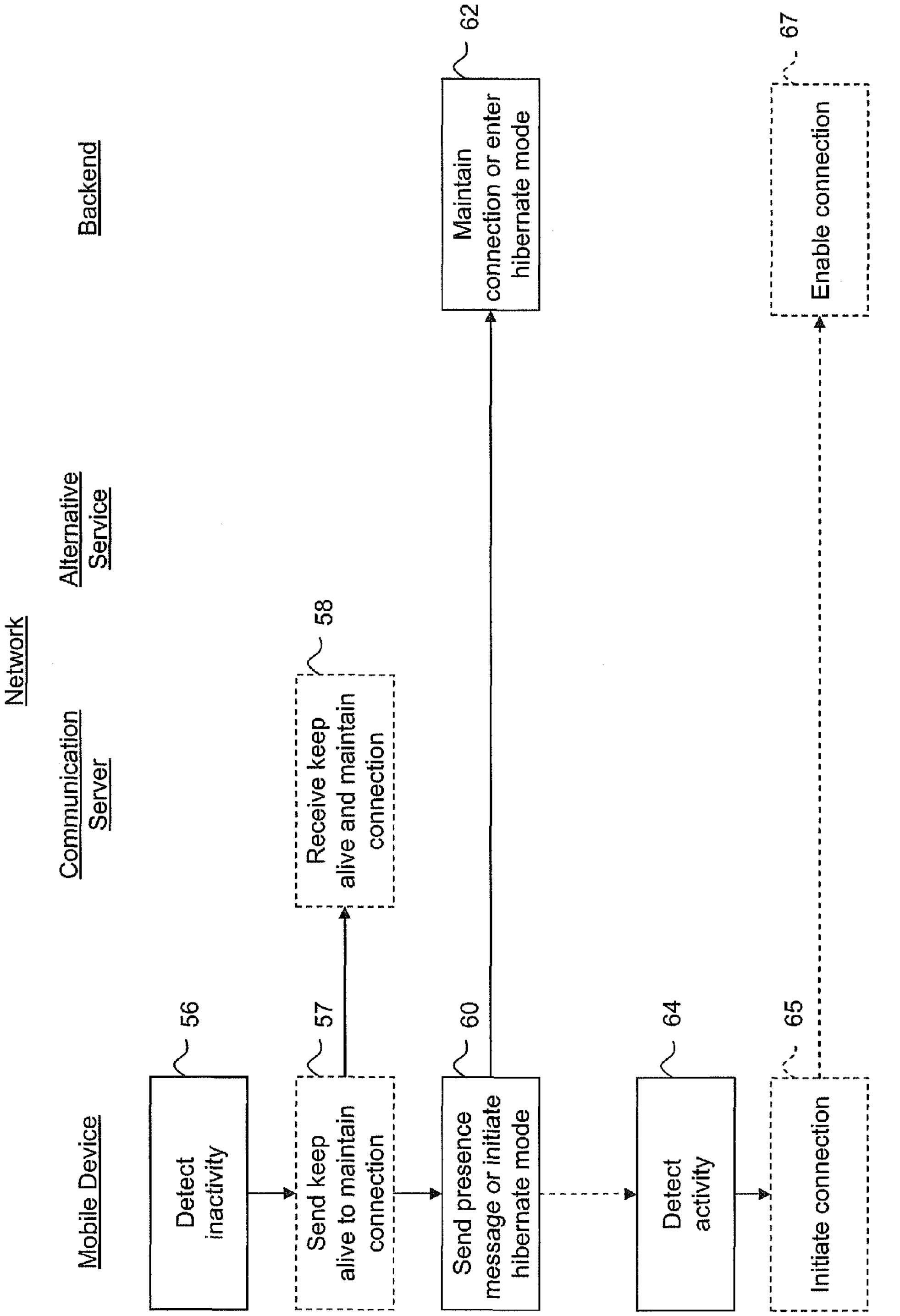
FIG. 6 is a flow chart providing an example set of computer executable operations for maintaining a connection with an application server during a period of inactivity and subsequently reconnecting.

In addition to updating a user's state, inactivity can trigger the mobile device 10 to maintain a connection that would otherwise be dropped or disconnected after a certain period of time. FIG. 6 illustrates an example, wherein the mobile device 10 detects inactivity at 56 (e.g., by determining "N" at 38 in FIG. 3). If the mobile device 10 communicates with the backend 8 via the communication server 4 (e.g., to obtain a socket connection therefrom), a connection with the communication server 4 may optionally be maintained. In such scenarios, as shown in dashed lines in FIG. 6, the mobile device 10 can send a keep alive message or instruction ("keep alive" hereinafter) to the communication server 4 at 57 (e.g., upon arriving at 42 in FIG. 3). The keep alive sent by the mobile device 10 prevents the communication server 4 from closing a connection it has provided or facilitates to enable the mobile device 10 to connect to the social networking application 18 via the network. In these scenarios, the communication server 4 receives the keep alive instruction at 58 and maintains the connection that allows the mobile device 10 to communicate with the backend 8 (e.g., a socket connection).

In embodiments wherein the mobile device 10 is not communicable with or otherwise does not utilize the alternative communication service 6, operations may be required to accommodate a timeout requirement by the chat platform 14 in the backend 8. For example, the chat platform 14 may close a connection with the mobile device 10 if it has not seen any activity or presence updates or other data from the mobile device 10 in a particular amount of time. To maintain the connection with the chat platform 14 (e.g., XMPP connection or via other protocol), in this example, a presence message is sent at 60 by the mobile device 10 to the backend 8 and the connection is maintained due to receipt of such a presence message at 62. Since the connection with the chat platform 14 is maintained even if there is no activity detected on the mobile device 10, upon detecting subsequent activity at 64, the user may continue to communicate via the chat platform 14 seamlessly and no further reconnections are needed.

In embodiments wherein the mobile device 10 is communicable with and utilizes the alternative communication service 6 to operate in a hibernate mode (as discussed in greater detail below), rather than sending a presence message to the chat platform 14 to maintain a connection, the mobile device 10 may send an instruction to the chat platform 14 at 60 to initiate the hibernate mode and thus hand over communications to the alternative communication client 16 and alternative communication service 6 until activity resumes. In such embodiments, the instruction is received by the backend 8 (e.g., by the chat platform 14 or alternative communication client 16) at 62. Entering hibernate mode may be performed in various ways, such as the example shown in FIG. 10, described below. Since the connection with the chat platform 14 may be closed when operating in hibernate mode, upon detecting activity at 64, a reconnection is initiated at 65 in order to have the mobile device 10 connect to the chat platform 14 to re-establish the normal or regular communication channel. The backend 8 would, in such scenarios, enable a connection with the chat platform 14 to be established at 67.

Figure 7:
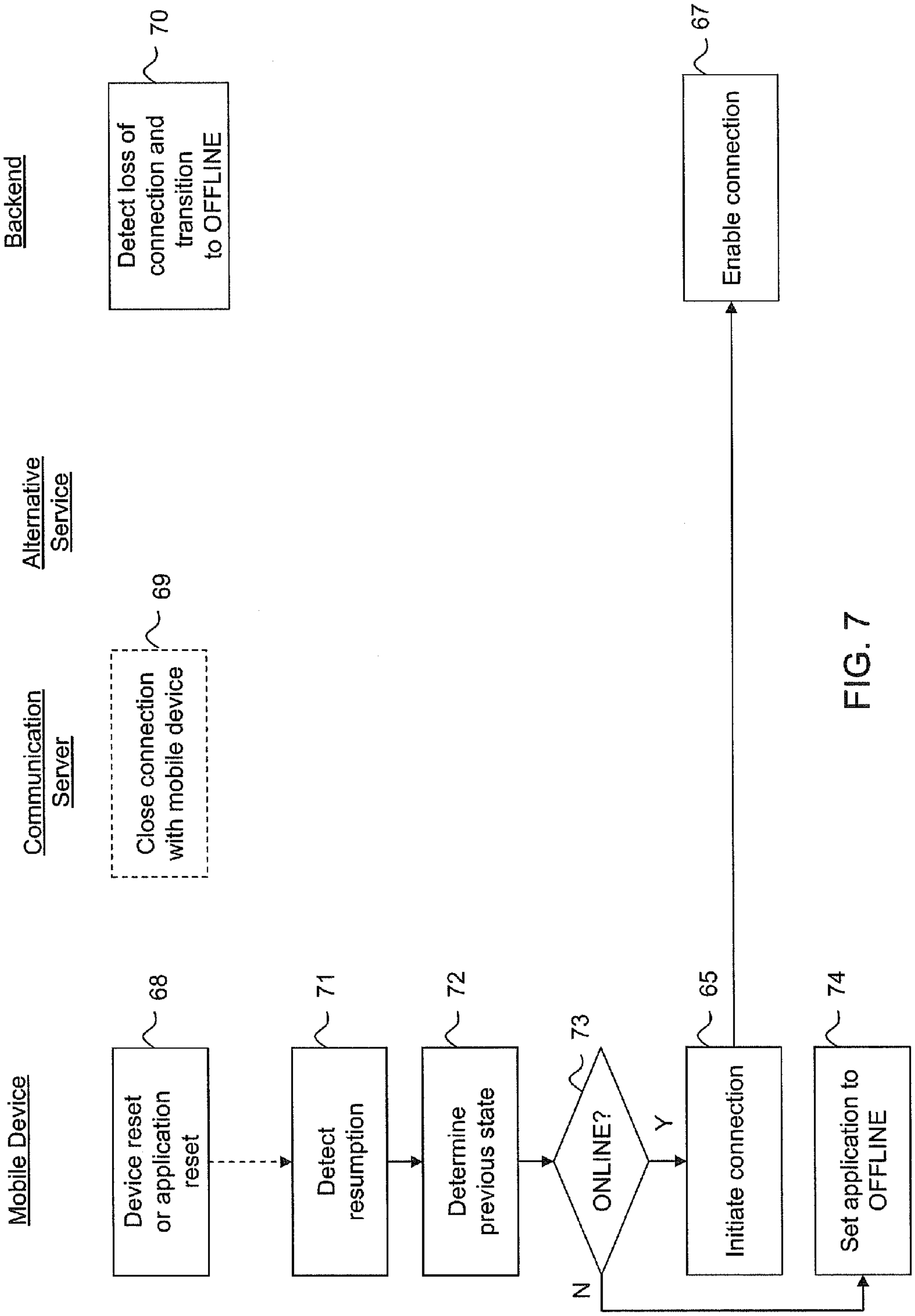
FIG. 7 is a flow chart providing an example set of computer executable operations for updating an application state during a device or application reset and subsequently restoring a previous state.

FIG. 7 illustrates an example scenario wherein a device or application reset occurs, or a connection error occurs, and the connection between the mobile device 10 and the backend 8 is temporarily lost but subsequently re-established. The device or application reset is detected or otherwise occurs on the mobile device 10 at 68. In embodiments wherein the mobile device 10 utilizes a connection provided by the communication server 4, this would cause a disruption in the connection between the mobile device 10 and the communication server 4, which would be detected by the communication server 4 at 69. The backend 8 would, at some point, also detect the loss of a connection with the mobile device 10 at 70, e.g., after failing to detect a normal data communication, presence update, etc. Once the backend 8 has determined that no activity has occurred in a predetermined amount of time, that user will eventually be shown as OFFLINE from the perspective of other devices 10, 12. For example, if the mobile device 10 is ONLINE and does not support the hibernate mode, and a presence message (or other activity) is not detected over a predetermined period of time, the connection to that mobile device 10 may be closed by the chat platform 14 and the user set to OFFLINE. If the mobile device 10 is IDLE and supports the hibernate mode, and the hibernate mode has been active for another predetermined period of time (i.e. a reconnection by the mobile device 10 has not been attempted), the backend 8 may also close the alternative communication channel and transition that user to OFFLINE.

A resumption of the mobile device 10 and/or social networking application 18 is detected at 71. As noted above, by storing the chat state 32 the mobile device 10 can determine the previous chat state at 72 and determine at 73 if the user was previously ONLINE (e.g., ONLINE or IDLE). If the user was ONLINE or IDLE before the device or application reset, a connection can be established at 65 and 67 as discussed above. If the user was previously OFFLINE, the social networking application 18 state can be set to be OFFLINE at 74.

Figure 8:
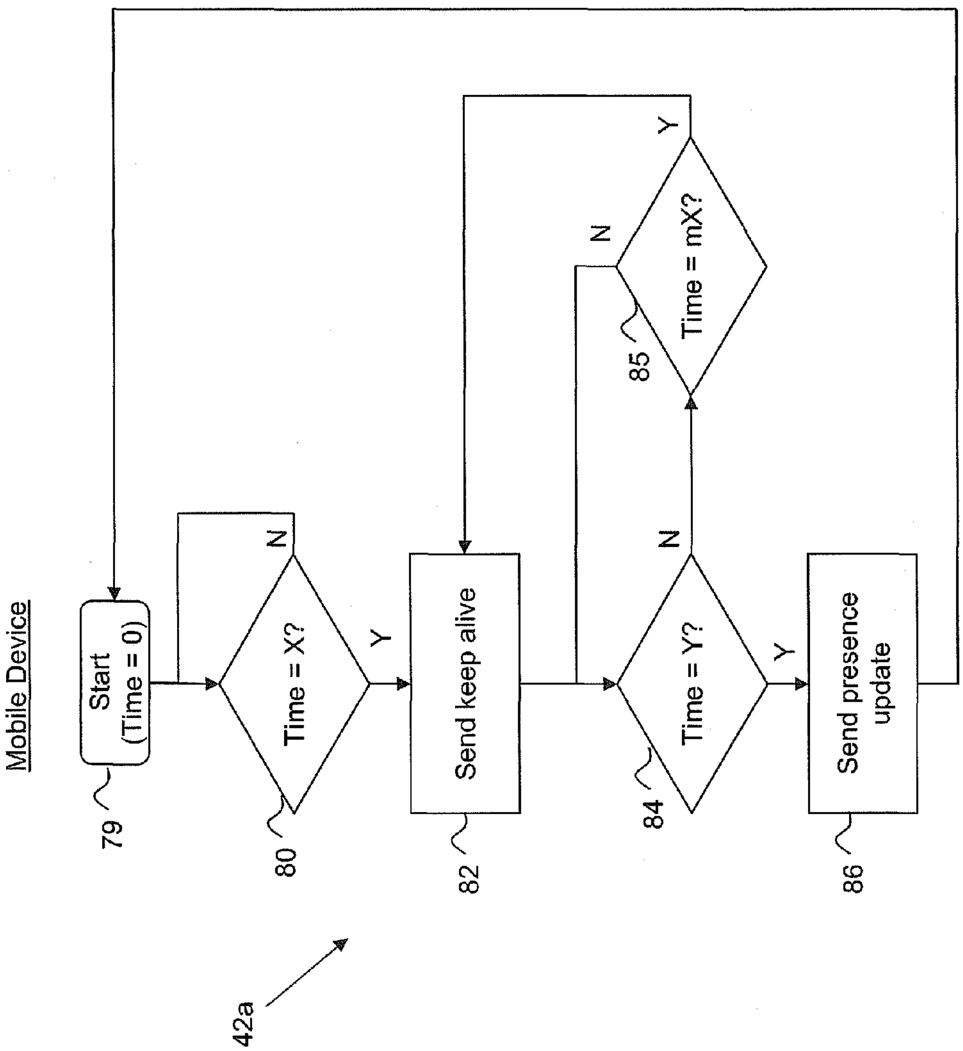
FIG. 8 is a flow chart providing an example set of computer executable operations for maintaining a connection with an application server.

As discussed above, maintaining a connection between the mobile device 10 and the backend 8 at 42 can be achieved in various ways. One example 42*a* is shown in FIG. 8, wherein a persistent connection between the social networking application 18 and the backend 8, via a connection provided through the communications server 4, is maintained during inactivity to enable others to communicate with that user even if they are not actively using the social networking application 18. Upon determining that a connection needs to be maintained to compensate for inactivity with respect to the social networking application 18, the method 42*a* starts at 79 and a timer begins with Time=0. The mobile device 10 determines at 80 if a particular amount of time X has elapsed since the timer started at 79. The amount of time X typically depends on the timeout period established by the communication server 4 or the chat platform 14, i.e. the amount of time it will allow to pass before closing a connection (e.g., 1.5 minutes). If the amount of time X has not yet elapsed, the mobile device 10 may continue to monitor the timer at 80. Once the amount of time X has elapsed, a first keep alive is sent to the communications server 4 at 82 to maintain the connection. In addition to keeping a connection between the mobile device 10 and the communication server 4 alive despite inactivity, in this example, other operations are performed to maintain the connection with the backend 8 and thus maintain the appearance of being ONLINE. In this example, the mobile device 10 determines at 84 if a second amount of time Y has passed since the timer started (e.g., 10 minutes). If not, the mobile device 10 determines at 85 if a multiple (m) of the time X has elapsed. If not, the times Y and mX continue to be monitored at 84 and 85 respectively. If a multiple of time X (i.e., mX) has elapsed since the timer started but the time Y has not yet elapsed, one or more second or subsequent or intervening keep alive messages can be sent at 82. The mobile device 10 may then continue monitoring the amount of time since the timer started at 79 until the second amount of time Y has elapsed. Once the second amount of time Y has passed, a presence update is sent at 86 to the backend 8 in order to keep the user in the ONLINE state. The timer may then be restarted at 79 and the method repeated until further activity with respect to the social networking application 18 is detected. It can be appreciated that the example operations shown in FIG. 8 may be used when a mobile device 10 connects to the backend 8 via a connection provided by the communications server 4. In other embodiments wherein the communications server 4 is not used or needed, the mobile device 10 may maintain a connection with the backend 8 by tracking only time Y from when the timer starts at 79, and sending presence updates accordingly.

Figure 9:
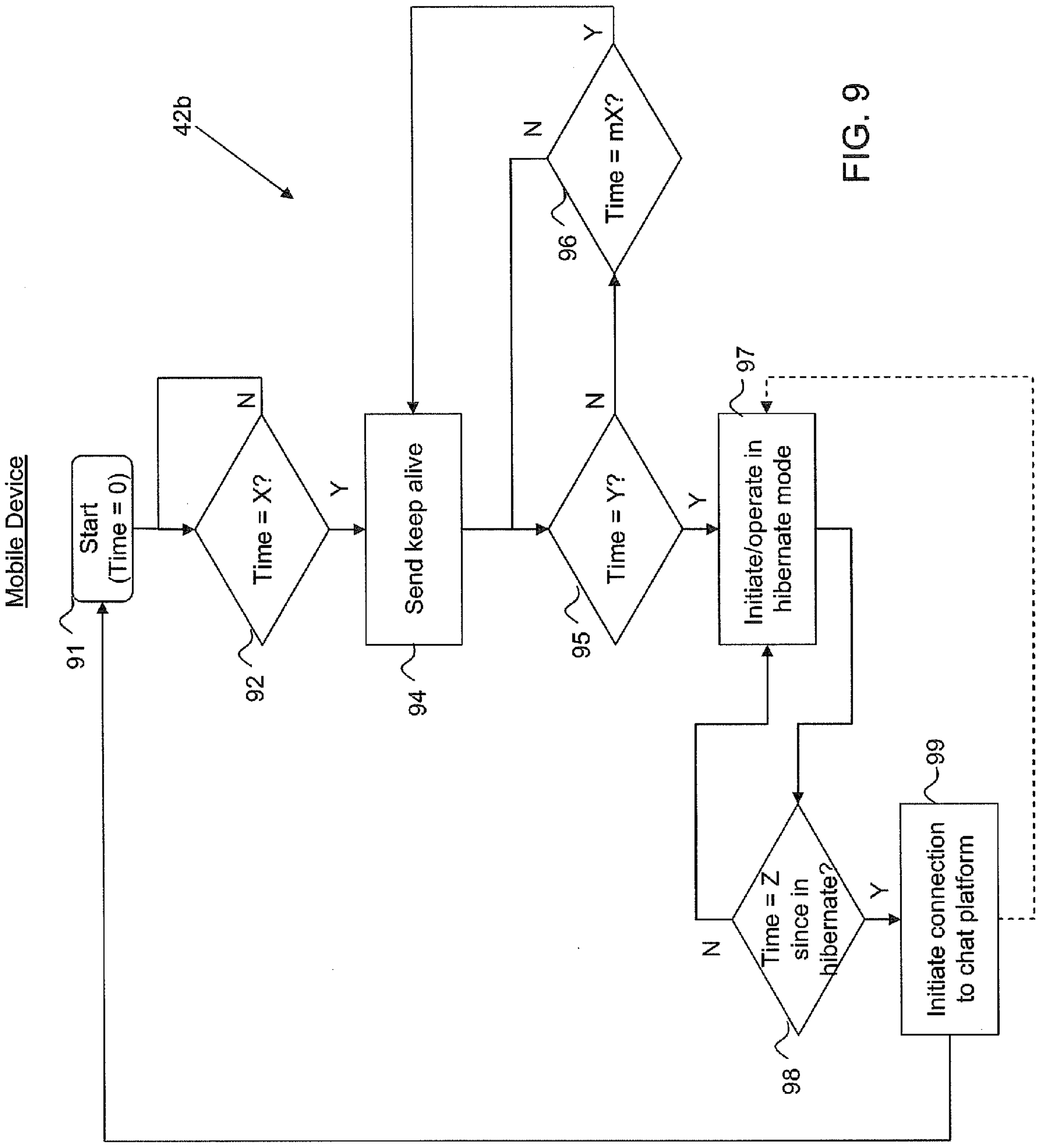
FIG. 9 is a flow chart providing an example set of computer executable operations for maintaining a connection with an application server using a hibernate mode.

FIG. 9 illustrates another example **42*b*, wherein the connection between the mobile device 10 and the communication server 4 is maintained for a particular amount of time before closing that connection, and relying on the alternative communication service 6 to receive data from the backend 8. In the example shown in FIG. 9, upon determining that a connection needs to be maintained to compensate for inactivity with respect to the social networking application 18, the method 42*b* starts at 91 and a timer begins with Time=0. The mobile device 10 determines at 92 if a particular amount of time X has elapsed since the timer started at 79. Similar to the above, the amount of time X typically depends on the timeout period established by the communication server 4, i.e. the amount of time it will allow to pass before closing a connection. If the amount of time X has not yet elapsed, the mobile device 10 may continue to monitor the timer at 92. Once the amount of time X has elapsed, a first keep alive is sent to the communications server 4 at 94 to maintain the connection. As in method 42*a*, in addition to keeping a connection between the mobile device 10 and the communication server 4 alive despite inactivity, in this example, other operations are performed to maintain the connection with the backend 8 and thus maintain the appearance of being ONLINE. In this example, the mobile device 10 determines at 95 if a second amount of time Y has passed since the timer started. If not, the mobile device 10 determines at 96 if a multiple (m) of the time X has elapsed. If not, the times Y and mX continue to be monitored at 95 and 96 respectively. If a multiple of time X (i.e., mX) has elapsed since the timer started but the time Y has not yet elapsed, one or more second or subsequent or intervening keep alive messages can be sent at 94. By sending one or more keep alive messages at 94, a connection via the communication server 4 is maintained. The mobile device 10 may then continue monitoring the amount of time since the timer started at 91** until the second amount of time Y has elapsed.

In this example, once the mobile device 10 determines at 95 that a second amount of time Y has elapsed, the mobile device 10 can initiate a hibernate mode at 97 to hand off communications between the mobile device 10 and the backend 8 to the alternative communication service 6 during the inactive period. It can be appreciated that by utilizing one or more keep alive messages at 94, short periods of inactivity can be accommodated without reverting to the hibernate mode at 97. As discussed above, a timeout period may be imposed by the backend 8 during the hibernate mode. In such cases, the mobile device 10 determines, while in hibernate mode, whether or not a third amount of time Z has elapsed (e.g., 1 or more hours) since the mobile device 10 has entered the hibernate mode. If not, the mobile device 10 may continue to operate in hibernate mode at 97. If the amount of time Z has elapsed, to avoid the alternative communication channel being closed by the backend 8, the mobile device 10 initiates a reconnection with the chat platform 14 at 99. It can be appreciated that upon initiating a reconnection to the chat platform 14 at 99, the timer may be restarted at 91 and the normal communications channel again used, or, as shown in dashed lines, the mobile device 10 may continue to operate in hibernate mode at 97. By continuing to operate in hibernate mode, it can also be appreciated that additional operations may be required at 99 to have the alternative communication client 16 continue to operate rather than reverting to a normal connection via the chat platform 14.

It can also be appreciated that the example operations shown in FIG. 9 may be used when a mobile device 10 connects to the backend 8 via a connection provided by the communications server 4. In other embodiments wherein the communications server 4 is not used or needed, the mobile device 10 may maintain a connection with the backend 8 by tracking only times Y and Z and sending presence updates and reconnecting accordingly.

Figure 10:
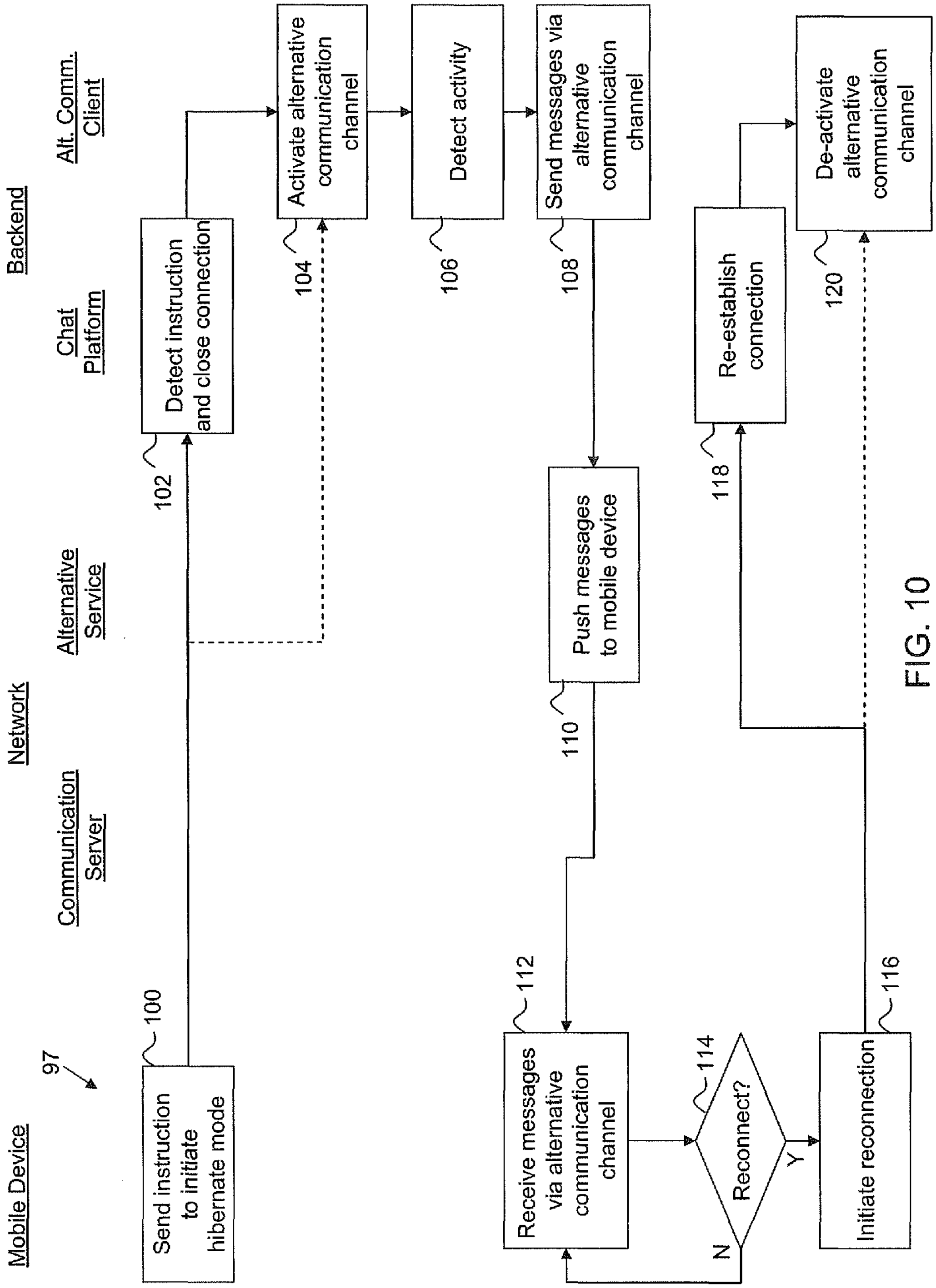
FIG. 10 is a flow chart providing an example set of computer executable operations for utilizing a hibernate mode for maintaining a connection with an application server.

An example set of computer executable operations that may be executed upon initiating the hibernate mode at 97 is provided in FIG. 10. At 100, the mobile device 10 sends an instruction to the chat platform 14 to enter the hibernate mode and thus have the connection with the chat platform 14 closed. Upon receiving such an instruction at 102, the chat platform 14 in this example closes this connection and has the alternative communication client 16 activate or otherwise initiate an alternative communication channel at 104 via the alternative communication service 6 if and when required. It can be appreciated that, as shown in dashed lines in FIG. 10, the mobile device 10 may also separately instruct the alternative communication client 16 to begin communicating new activity destined thereto via the alternative communication channel.

Upon detecting activity associated with the user of the mobile device 10 at 106, e.g., a message sent by another device 10, 12 to the mobile device 10 shown in FIG. 10, the alternative communication client 16 sends such messages via the alternative communication channel at 108. This may be done by sending messages to the alternative communication service 6 to be "pushed" or otherwise forwarded to the mobile device 10 at 110. The mobile device 10 is thus capable of receiving messages via the alternative service listener 30 even when the user is not actively using the social networking application 18 and without having to maintain the connection with the chat platform 14. Where the connection to the chat platform 14 (e.g., using the communication server 4) has any one or more of a monetary cost, processing burden, and bandwidth cost, when compared to use of the alternative communication service 6, such a hybrid communication protocol can be particularly advantageous both to the user and to the overall infrastructure.

The mobile device 10 may then determine at 114 whether or not the social networking application 18 should be reconnected to the chat platform 14. A reconnection may be automatically established upon detecting new activity with respect to the social networking application 18 or may be initiated via user feedback, as shown by way of example below. If there is no reason to reconnect, the social networking application 18 may continue receiving messages via the alternative service listener 30 at 112, e.g., until the amount of time Z has elapsed as shown in FIG. 9. If new activity is detected or a user input is detected indicative of a request to reconnect, a reconnection is initiated by the mobile device 10 at 116, thus re-establishing the connection with the chat platform 14 at 118. The alternative communication channel for that mobile device 10 is then de-activated at 120, either by the chat platform 14 or the mobile device 10 (e.g., as shown using dashed lines in FIG. 10).

Figure 11:
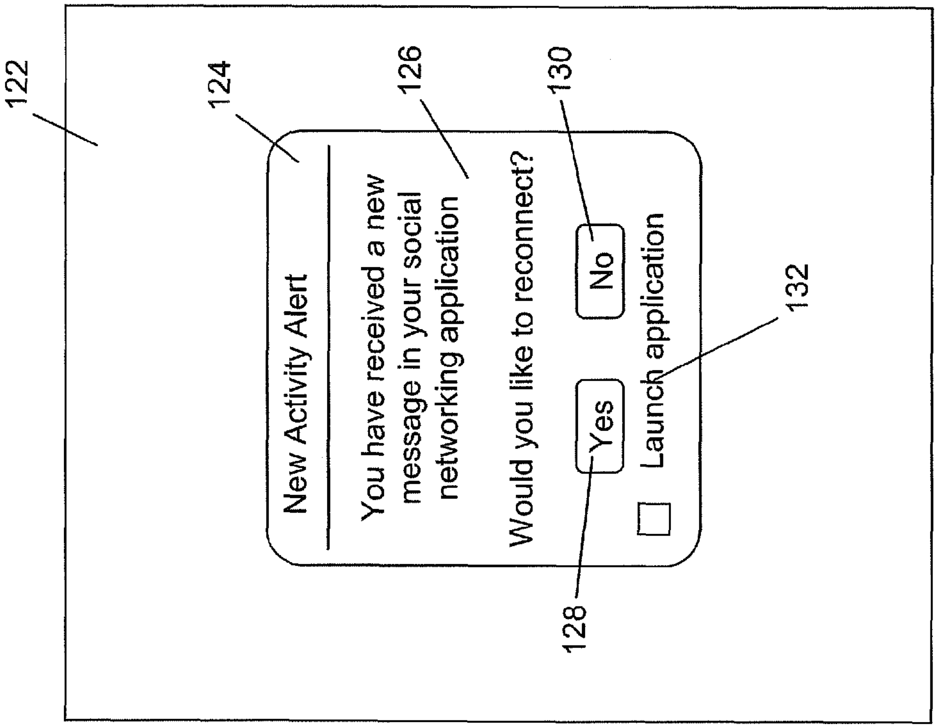
FIG. 11 is a screen shot of an example mobile device user interface (UI) displaying a new activity alert while in hibernate mode using a prompt.

FIG. 11 illustrates an example mobile device UI 122 displaying a prompt 124. The prompt 124 may be displayed upon the alternative service listener 30 detecting a new message received via the alternative communication channel in order to advise the user. It can be appreciated that the use of such prompts can be user-configurable and optionally used or not used. In this example, the new activity alert provides a message 126 indicating that a new message has been received for the social networking application 18 and asks the user whether or not they wish to reconnect. A Yes button 128 and a No button 130 are provided to obtain a reply. A Launch Application selection box 132 is also provided to enable the user to have the social networking application 18 displayed immediately. It can be appreciated that the mobile device 10 may instead rely on the user determining that the new messages have arrived on their own accord such that the user is unaware of the hibernate mode. In such cases, the prompt 124 may not be used.

Figure 12:
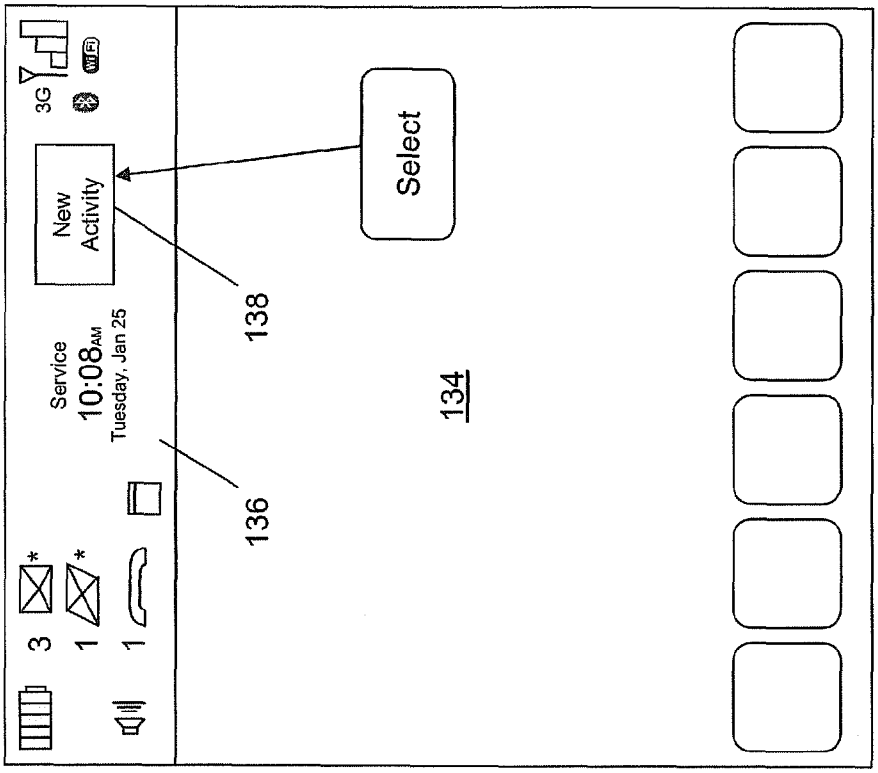
FIG. 12 is a screen shot of an example mobile device UI displaying a new activity alert while in hibernate mode using a banner notification.

It can be appreciated that in addition to or rather than the prompt 124, other notifications may be provided indicative of receipt of new data related to the social networking application 18, via either the normal communication channel or the alternative communication channel. FIG. 12 illustrates an example home screen UI 134 which comprises a banner portion 136. The banner portion 136 in this example includes, among other things, a series of notification icons for various communication-capable applications such as email, SMS, telephone as well as other notifications such as those related to calendar appointments, etc. In this example, a social networking new activity icon 138 is also displayed upon receiving a new message for the social networking application 18. The new activity icon 138 may be selected as shown to display the chat UI 24 or other social networking application UI 24 (e.g., a contact list, etc.). By continuing to use one or more notifications indicative of incoming messages detected by the alternative service listener 30, the mobile device 10 can operate in hibernate mode without the user being aware of any changes in the application experience.

Figure 13:
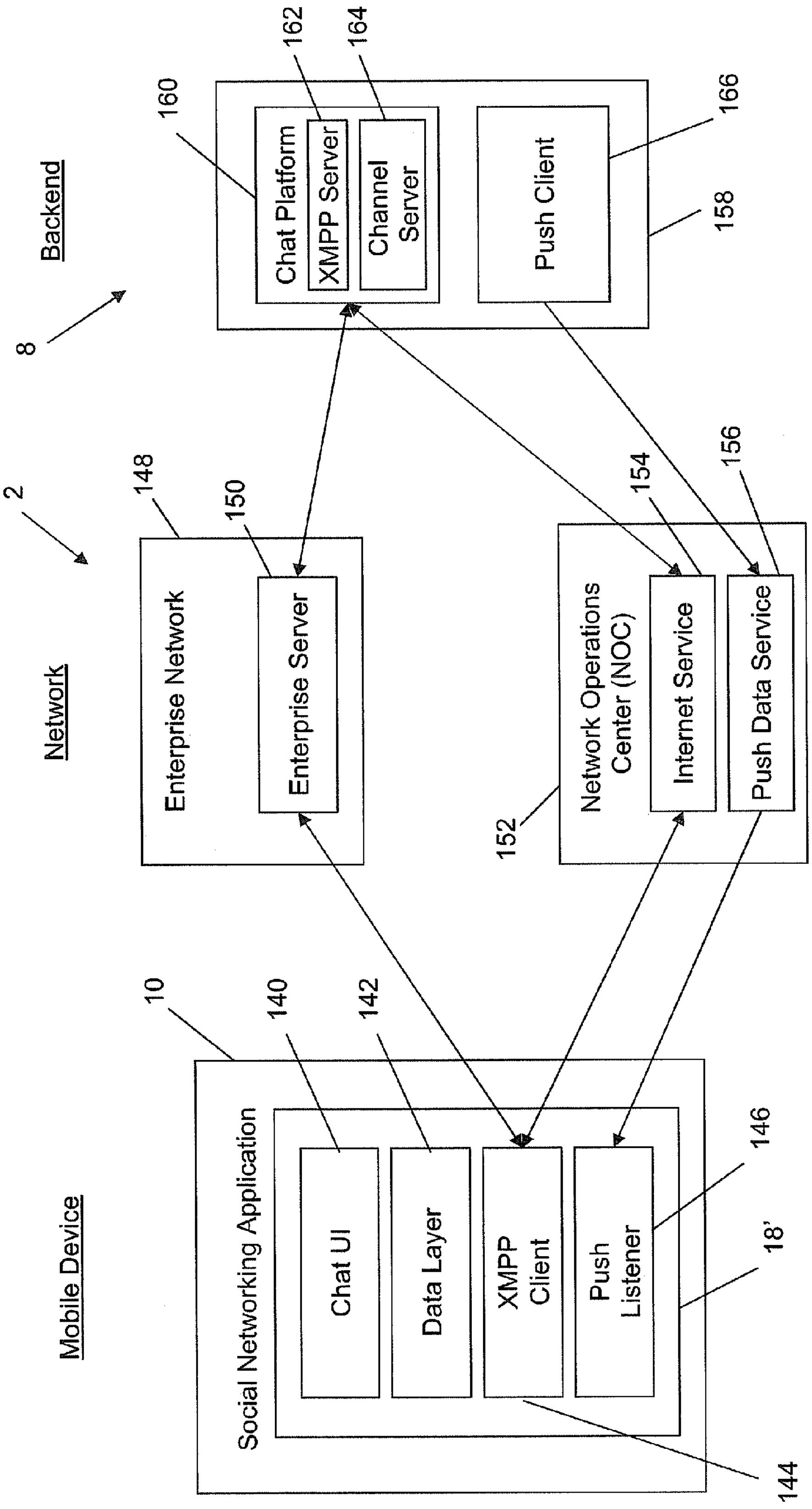
FIG. 13 is a block diagram of an example wireless communication system utilizing an extensible messaging and presence protocol (XMPP) communications protocol.

Turning now to FIG. 13, another example communication system is shown, which is configured to operate according to the extensible messaging and presence protocol (XMPP) communications protocol. XMPP is an open-standards communications protocol for message-oriented middleware based on the extensible mark-up language (XML). It can be appreciated that other protocols may be used according to the principles discussed herein.

In FIG. 13, the social networking application 18' is configured to include an XMPP client 144 for communicating with an XMPP server 162 in the chat platform using a transmission control protocol (TCP) socket. In this example, the TCP socket may be facilitated or otherwise provided by an enterprise server 150 in an enterprise network 148 or an internet service 154 in a network operations center (NOC) 152. In this example, the enterprise network 148 and NOC 152 are part of the network 2, but it may be appreciated that they may be provided in separate networks 2. The TCP socket may be a direct TCP connection, a BIS-B TCP socket, WiFi connection, etc. The social networking application 18' also includes a push listener 146 for listening for messages sent thereto over a wireless application protocol (WAP) via a push data service 156 in the NOC 152. In this example, the push data service 156 enables the alternative communication channel between the mobile device 10 and backend 8 as discussed above.

The network 2 in the example shown in FIG. 13 includes two normal communication channels to connect the mobile device 10 to the chat platform 160, namely the enterprise server 150 and the internet service 154. For mobile devices 10 that are registered with and utilize an enterprise network 148 they can communicate with an XMPP server 162 hosted by a chat platform 160 in the social network infrastructure 158. The chat platform 160 in this example also includes a channel server 164 for performing presence management. For applications or users that cannot connect via the enterprise server 150, in this example, the NOC 152, which is a component of a service provider for the mobile device 10 can provide an internet service 154 to enable the mobile device 10 to connect to the XMPP server 162.

The NOC 152 also hosts the push data service 156 which may be provided for other forms of communication, e.g., push email to and from the mobile device 10. A push client 166 is provided in the social network infrastructure 158 to enable messages destined for the mobile device 10 when that mobile device 10 is in hibernate mode, to be sent via the alternative communications channel.

In one example embodiment, the push data service 156 may be operable for continuously routing all forms of pushed information from both the push client 166 and the enterprise network 148 to the mobile device 10. One example of such a system will now be described making reference to FIG. 14.

Figure 14:
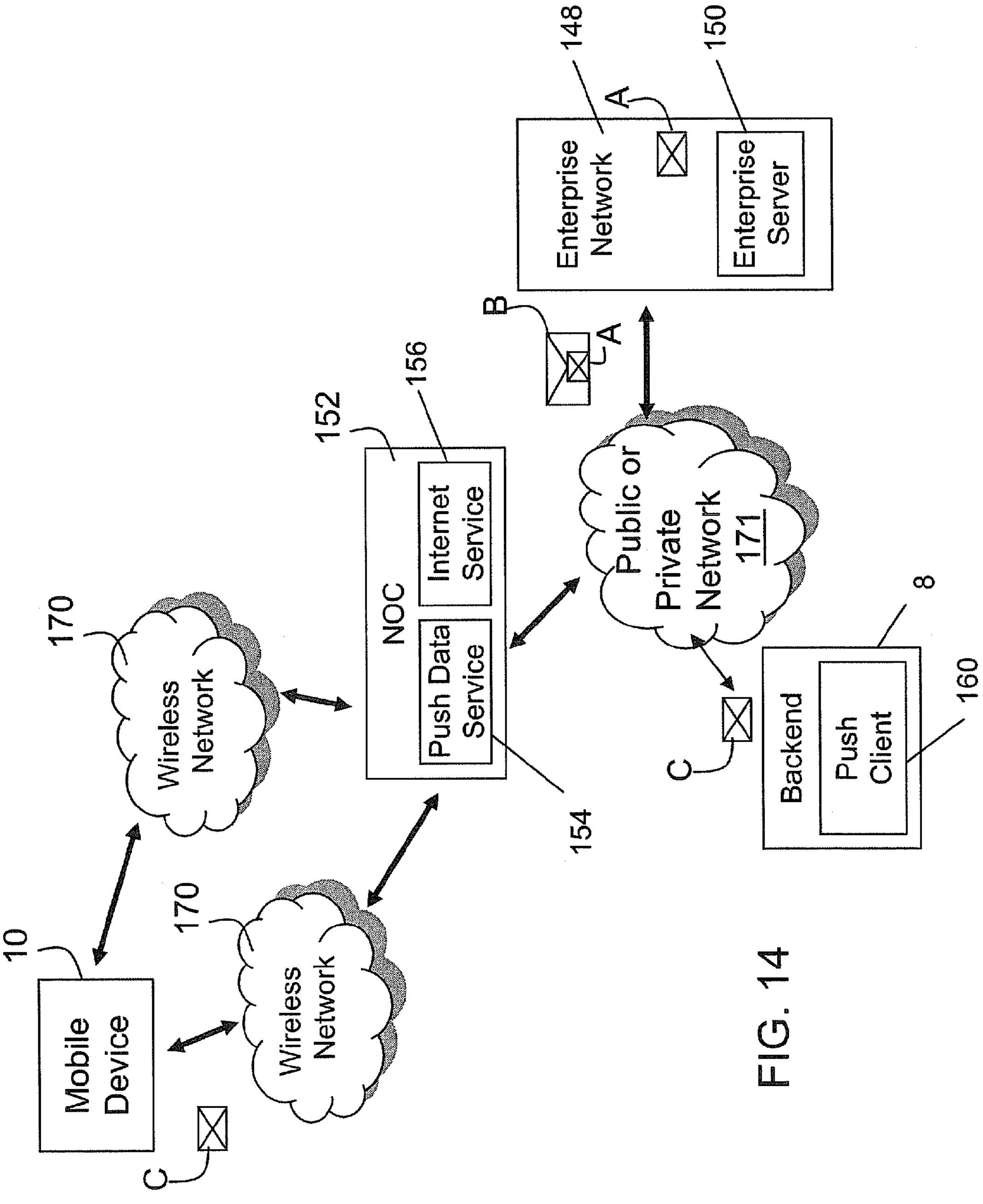
FIG. 14 is a system diagram illustrating an environment in which data items are pushed from an enterprise system to a mobile device.

FIG. 14 is an example system diagram showing the redirection of user data items (such as message A or C) from the push client or corporate enterprise computer system (enterprise network) 148 to the user's mobile device 10 via the NOC 152. The NOC 152 provides the wireless connectivity functionality as it acts to both abstract most of a wireless network's 170 complexities, and it also implements features necessary to support pushing data to the mobile device 10. Although not shown, a plurality of mobile devices 10 may access data from the enterprise network 148. In this example, message A in FIG. 14 represents an internal message sent from, e.g., a desktop computer 12 within the enterprise network 148, to any number of server computers in a corporate network (e.g., LAN), which may, in general, include a database server, a calendar server, an E-mail server, a voice-mail server, etc.

As can be seen in FIG. 14, the NOC 152 can be configured to include or otherwise provide the push data service 154 and internet service 156, or components or modules capable of providing similar services.

Message C in FIG. 14 represents an external message from a sender that is not directly connected to the enterprise network 148, such as the user's mobile device 10, some other user's mobile device (not shown), the backend 8, or any user connected to a public or private network 171 (e.g., the Internet). Message C could be, in addition to social networking data, e-mail, voice-mail, an instant message (IM), calendar information, database updates, web-page updates or could even represent a command message from the user's mobile device 10 to the enterprise network 148. The enterprise network 148 may comprise, along with the typical communication links, hardware and software associated with a corporate enterprise computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a corporate firewall.

The mobile device 10 may be operable for communication within wireless network 170 via wireless links, as required by each wireless network 170 being used. As an illustrative example of the operation for a NOC 152 shown in FIG. 14, consider a data item A, repackaged in outer envelope B (the packaged data item A now referred to as "data item (A)") and sent to the mobile device 10 from an Application Service Provider (ASP) in the enterprise network 148. Within the ASP is a computer program, similar to a wireless mobility agent, running on any computer in the ASP's environment that is sending requested data items from a data store to a mobile device 10. The mobile-destined data item (A) is routed through the network 171, and through the wireless router's firewall (not shown) protecting the NOC 152.

Although the above describes the enterprise network 148 as being used within a corporate enterprise network environment, this is just one embodiment of one type of host service that offers push-based messages for a handheld wireless device that is capable of notifying and preferably presenting the data to the user in real-time at the mobile device when data arrives at the enterprise network 148.

By offering a NOC 152 (sometimes referred to as a "router" or "relay"), there are a number of major advantages to both the enterprise network 148 and the wireless network 170. The enterprise network 148 in general runs a host service that is considered to be any computer program that is running on one or more computer systems. The host service is said to be running on a enterprise network 148, and one enterprise network 148 can support any number of host services. A host service may or may not be aware of the fact that information is being channelled to mobile devices 10. For example an e-mail or message program might be receiving and processing e-mail while an associated program (e.g., an e-mail wireless mobility agent) is also monitoring the mailbox for the user and forwarding or pushing the same e-mail to a mobile device 10. A host service might also be modified to prepare and exchange information with mobile devices 10 via the NOC 152, like customer relationship management software. In a third example, there might be a common access to a range of host services. For example a mobility agent might offer a WAP connection to several databases.

In data messaging environments, the NOC 152 may abstract the mobile device 10 and wireless network 170, offer push services to standard web-based server systems and allow a host service in a enterprise network 148 to reach the mobile device 10 in many countries.

The enterprise network 148 shown herein has many methods when establishing a communication link to the NOC 152. For one skilled in the art of data communications the enterprise network 148 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of enterprise networks 148 that might employ the NOC 152 to perform push could include: field service applications, e-mail services, IM services, stock quote services, banking services, stock trading services, field sales applications, advertising messages and many others. This wireless network 170 abstraction is made possible by the NOC 152, which implements this routing and push functionality. The type of user-selected data items being exchanged by the host could include: E-mail messages, instant messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the enterprise network 148, or that the enterprise network 148 acquires through the use of intelligent agents, such as data that is received after the enterprise network 148 initiates a search of a database or a website or a bulletin board.

The NOC 152 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like Enhanced Data Rates for GSM Evolution (EDGE), Universal Mobile Telecommunications System (UMTS) and High-Speed Downlink Packet Access (HSDPA), Long Term Evolution (LTE), Wi-Max etc. Some older examples of data-centric networks include, but are not limited to: (1) the Mobitex Radio Network ("Mobitex") and (2) the DataTAC Radio Network ("DataTAC").

To be effective in providing push services for enterprise networks 148, the NOC 152 may implement a set of defined functions. It can be appreciated that one could select many different hardware configurations for the NOC 152, however, many of the same or similar set of features would likely be present in the different configurations.

Figure 15:
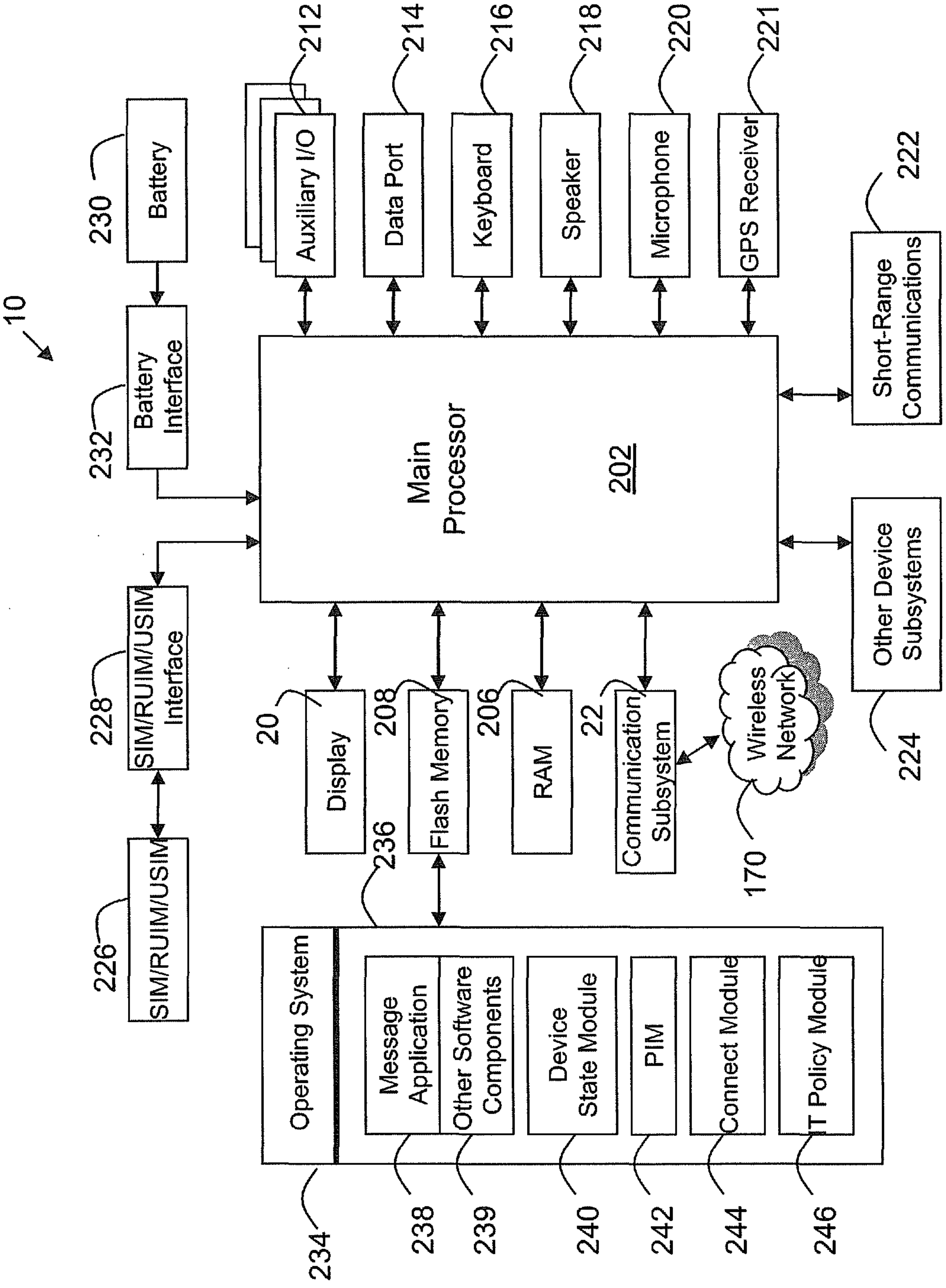
FIG. 15 is a block diagram of an example configuration for a mobile device.

Referring now to FIG. 15, shown therein is a block diagram of an example embodiment of a mobile device 10. The mobile device 10 comprises a number of components such as a main processor 202 that controls the overall operation of the mobile device 10. Communication functions, including data and voice communications, are performed through a communication subsystem 22. The communication subsystem 22 receives messages from and sends messages to a wireless network 170. In this example embodiment of the mobile device 10, the communication subsystem 22 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 22 with the wireless network 170 represents one or more different Radio Frequency (RF) channels, operating according to defined protocols specified for GSM/GPRS communications. With newer network protocols, these channels are capable of supporting both circuit switched voice communications and packet switched data communications.

The main processor 202 also interacts with additional subsystems such as a Random Access Memory (RAM) 206, a flash memory 208, a display 20, an auxiliary input/output (I/O) subsystem 212, a data port 214, a keyboard 216, a speaker 218, a microphone 220, GPS receiver 221, short-range communications subsystem 222 and other device subsystems 224.

Some of the subsystems of the mobile device 10 perform communication-related functions, whereas other subsystems may provide "resident" or on-device functions. By way of example, the display 210 and the keyboard 216 may be used for both communication-related functions, such as entering a text message for transmission over the wireless network 170, and device-resident functions such as a calculator or task list.

The mobile device 10 can send and receive communication signals over the wireless network 170 after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 226 is to be inserted into a SIM/RUIM/USIM interface 228 in order to communicate with a network. The SIM/RUIM/USIM component 226 is one type of a conventional "smart card" that can be used to identify a subscriber of the mobile device 10 and to personalize the mobile device 10, among other things. Without the component 226, the mobile device 10 may not be fully operational for communication with the wireless network 170. By inserting the SIM/RUIM/USIM 226 into the SIM/RUIM/USIM interface 228, a subscriber can access all subscribed services. Services may include: web browsing and messaging such as e-mail, voice mail, SMS, and MMS. More advanced services may include: point of sale, field service and sales force automation. The SIM/RUIM/USIM 226 includes a processor and memory for storing information. Once the SIM/RUIM/USIM 226 is inserted into the SIM/RUIM/USIM interface 228, it is coupled to the main processor 202. In order to identify the subscriber, the SIM/RUIM/USIM 226 can include some user parameters such as an International Mobile Subscriber Identity (IMSI). An advantage of using the SIM/RUIM/USIM 226 is that a subscriber is not necessarily bound by any single physical mobile device. The SIM/RUIM/USIM 226 may store additional subscriber information for a mobile device as well, including datebook (or calendar) information and recent call information. Alternatively, user identification information can also be programmed into the flash memory 208.

The mobile device 10 is typically a battery-powered device and includes a battery interface 232 for receiving one or more batteries 230 (typically rechargeable). In at least some embodiments, the battery 68 can be a smart battery with an embedded microprocessor. The battery interface 232 is coupled to a regulator (not shown), which assists the battery 68 in providing power V+ to the mobile device 10. Although current technology makes use of a battery, future technologies such as micro fuel cells may provide the power to the mobile device 10.

The mobile device 10 also includes an operating system 234 and software components 236 to 246 which are described in more detail below. The operating system 234 and the software components 236 to 246 that are executed by the main processor 202 are typically stored in a persistent store such as the flash memory 208, which may alternatively be a read-only memory (ROM) or similar storage element (not shown). Those skilled in the art will appreciate that portions of the operating system 234 and the software components 236 to 246, such as specific device applications, or parts thereof, may be temporarily loaded into a volatile store such as the RAM 206. Other software components can also be included, as is well known to those skilled in the art.

The subset of software applications 236 that control basic device operations, including data and voice communication applications, may be installed on the mobile device 10 during its manufacture. Other software applications include a message application 238 that can be any suitable software program that allows a user of the mobile device 10 to send and receive electronic messages. Various alternatives exist for the message application 238 as is well known to those skilled in the art. Messages that have been sent or received by the user are typically stored in the flash memory 208 of the mobile device 10 or some other suitable storage element in the mobile device 10. In at least some embodiments, some of the sent and received messages may be stored remotely from the mobile device 10 such as in a data store of an associated host system that the mobile device 10 communicates with.

The software applications can further comprise a device state module 240, a Personal Information Manager (PIM) 242, and other suitable modules (not shown). The device state module 240 provides persistence, i.e. the device state module 240 ensures that important device data is stored in persistent memory, such as the flash memory 208, so that the data is not lost when the mobile device 10 is turned off or loses power.

The PIM 242 includes functionality for organizing and managing data items of interest to the user, such as, but not limited to, e-mail, contacts, calendar events, voice mails, appointments, and task items. A PIM application has the ability to send and receive data items via the wireless network 170. PIM data items may be seamlessly integrated, synchronized, and updated via the wireless network 170 with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

The mobile device 10 may also comprise a connect module 244, and an IT policy module 246. The connect module 244 implements the communication protocols that are required for the mobile device 10 to communicate with the wireless infrastructure and any host system, such as an enterprise system, that the mobile device 10 is authorized to interface with.

The connect module 244 includes a set of APIs that can be integrated with the mobile device 10 to allow the mobile device 10 to use any number of services associated with the enterprise system. The connect module 244 allows the mobile device 10 to establish an end-to-end secure, authenticated communication pipe with a host system (not shown). A subset of applications for which access is provided by the connect module 244 can be used to pass IT policy commands from the host system to the mobile device 10. This can be done in a wireless or wired manner. These instructions can then be passed to the IT policy module 246 to modify the configuration of the device 10. Alternatively, in some cases, the IT policy update can also be done over a wired connection.

The IT policy module 246 receives IT policy data that encodes the IT policy. The IT policy module 246 then ensures that the IT policy data is authenticated by the mobile device 10. The IT policy data can then be stored in the flash memory 208 in its native form. After the IT policy data is stored, a global notification can be sent by the IT policy module 246 to all of the applications residing on the mobile device 10. Applications for which the IT policy may be applicable then respond by reading the IT policy data to look for IT policy rules that are applicable.

Other types of software applications or components 239 can also be installed on the mobile device 10. These software applications 239 can be pre-installed applications (i.e. other than message application 238) or third party applications, which are added after the manufacture of the mobile device 10. Examples of third party applications include games, calculators, utilities, etc.

The additional applications 239 can be loaded onto the mobile device 10 through at least one of the wireless network 170, the auxiliary I/O subsystem 212, the data port 214, the short-range communications subsystem 222, or any other suitable device subsystem 224. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 214 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 214 can be any suitable port that enables data communication between the mobile device 10 and another computing device. The data port 214 can be a serial or a parallel port. In some instances, the data port 214 can be a USB port that includes data lines for data transfer and a supply line that can provide a charging current to charge the battery 68 of the mobile device 10.

The short-range communications subsystem 222 provides for communication between the mobile device 10 and different systems or devices, without the use of the wireless network 170. For example, the subsystem 222 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 22 and input to the main processor 202. The main processor 202 may then process the received signal for output to the display 210 or alternatively to the auxiliary I/O subsystem 212. A subscriber may also compose data items, such as e-mail messages, for example, using the keyboard 216 in conjunction with the display 210 and possibly the auxiliary I/O subsystem 212. The auxiliary subsystem 212 may comprise devices such as: a touch screen, mouse, track ball, infrared fingerprint detector, or a roller wheel with dynamic button pressing capability. The keyboard 216 is an alphanumeric keyboard and/or telephone-type keypad. However, other types of keyboards may also be used, such as a virtual or "soft" keyboard rendered as images on a touch screen. A composed item may be transmitted over the wireless network 170 through the communication subsystem 22.

For voice communications, the overall operation of the mobile device 10 in this example is substantially similar, except that the received signals are output to the speaker 218, and signals for transmission are generated by the microphone 220. Alternative voice or audio I/O subsystems, such as a voice message recording subsystem, can also be implemented on the mobile device 10. Although voice or audio signal output is accomplished primarily through the speaker 218, the display 210 can also be used to provide additional information such as the identity of a calling party, duration of a voice call, or other voice call related information.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, any component of or related to the network 2, backend 8, etc., or accessible or connectable thereto. Any application or module herein described may be implemented using computer readable/executable instructions that may be stored or otherwise held by such computer readable media.

It will also be appreciated that the example embodiments and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific embodiments, various modifications thereof will be apparent to those skilled in the art without departing from the scope of the claims appended hereto.

The invention claimed is:

1. A method of operating a mobile device, the method comprising:

storing a chat state indicative of interactivity with a chat feature in a social networking application using a first communication channel according to a first communications protocol;

receiving data associated with the chat feature using a second communication channel according to a second communications protocol during inactivity with the social networking application, the first communication channel being unavailable during the inactivity;

re-establishing the first communication channel;

detecting resumption of the social networking application using the first communications protocol subsequent to an interruption of the social networking application on the first communication channel;

determining the stored chat state; and restoring the chat feature for the social networking application using the first communication channel to the determined chat state.

2. The method according to claim 1, further comprising upon detecting inactivity with respect to the chat feature, executing one or more operations to maintain a connection with a server for the social networking application using the first communications protocol prior to receiving the data using the second communication channel.

3. The method according to claim 2, wherein the one or more operations comprises sending at least one message using the first communications protocol to maintain the connection, wherein a message is sent each time a first period of time has elapsed.

4. The method according to claim 2, wherein the one or more operations comprises sending an instruction to utilize the second communications protocol after a first predetermined amount of time.

5. The method according to claim 1, wherein receiving data according to the second communications protocol comprises receiving data pushed to the social networking application from a service different from that used to maintain the connection in accordance with the first communications protocol.

6. The method according to claim 5, further comprising reconnecting the social networking application to the application server and exchanging subsequent data for the chat feature in accordance with the first communications protocol.

7. The method according to claim 6, wherein the social networking application is reconnected using the first communication channel upon detecting an input.

8. The method according to claim 7, wherein the input comprises detecting new activity with respect to the chat feature.

9. The method according to claim 1, further comprising providing a notification indicative of receipt of the data in accordance with the second communications protocol.

10. The method according to claim 1, wherein the interruption results from any one or more of a device reset, a reset of the social networking application, and a connection error.

11. A mobile device comprising a processor, memory, a communication subsystem, a social networking application, and computer executable instructions for:

storing a chat state indicative of interactivity with a chat feature in a social networking application using a first communication channel according to a first communications protocol;

receiving data associated with the chat feature using a second communication channel according to a second communications protocol during inactivity with the social networking application, the first communication channel being unavailable during the inactivity;

re-establishing the first communication channel;

detecting resumption of the social networking application using the first communications protocol subsequent to an interruption of the social networking application on the first communication channel;

determining the stored chat state; and restoring the chat feature for the social networking application using the first communication channel to the determined chat state.

12. The mobile device according to claim 11, further comprising instructions for upon detecting inactivity with respect to the chat feature, executing one or more operations to maintain a connection with a server for the social networking application using the first communications protocol prior to receiving the data using the second communication channel.

13. The mobile device according to claim 12, wherein the one or more operations comprises sending at least one message using the first communications protocol to maintain the connection, wherein a message is sent each time a first period of time has elapsed.

14. The mobile device according to claim 12, wherein the one or more operations comprises sending an instruction to utilize the second communications protocol after a first predetermined amount of time.

15. The mobile device according to claim 11, wherein receiving data according to the second communications protocol comprises receiving data pushed to the social networking application from a service different from that used to maintain the connection in accordance with the first communications protocol.

16. The mobile device according to claim 15, further comprising instructions for reconnecting the social networking application to the application server and exchanging subsequent data for the chat feature in accordance with the first communications protocol.

17. The mobile device according to claim 16, wherein the social networking application is reconnected using the first communication channel upon detecting an input.

18. The mobile device according to claim 17, wherein the input comprises detecting new activity with respect to the chat feature.

19. The mobile device according to claim 11, further comprising instructions for providing a notification indicative of receipt of the data in accordance with the second communications protocol.

20. The mobile device according to claim 11, wherein the interruption results from any one or more of a device reset, a reset of the social networking application, and a connection error.

21. A non-transitory computer readable medium comprising computer executable instructions for:

storing a chat state indicative of interactivity with a chat feature in a social networking application using a first communication channel according to a first communications protocol;

receiving data associated with the chat feature using a second communication channel according to a second communications protocol during inactivity with the social networking application, the first communication channel being unavailable during the inactivity;

re-establishing the first communication channel;

detecting resumption of the social networking application using the first communications protocol subsequent to an interruption of the social networking application on the first communication channel;

determining the stored chat state; and restoring the chat feature for the social networking application using the first communication channel to the determined chat state.

22. The method according to claim 1, further comprising deactivating the second communication channel when re-establishing the first communication channel.

23. The method according to claim 1, the first communication channel being re-established either subsequent to detecting resumption of activity with the social networking application or after a second predetermined amount of time.

24. The mobile device according to claim 11, further comprising instructions for deactivating the second communication channel when re-establishing the first communication channel.

25. The mobile device according to claim 11, the first communication channel being re-established either subsequent to detecting resumption of activity with the social networking application or after a second predetermined amount of time.

* * * * *